United States Patent [19]
Watanabe

[11] Patent Number: 4,608,708
[45] Date of Patent: Aug. 26, 1986

[54] PATTERN MATCHING SYSTEM

[75] Inventor: Takao Watanabe, Tokyo, Japan

[73] Assignee: Nippon Electric Co., Ltd., Tokyo, Japan

[21] Appl. No.: 452,490

[22] Filed: Dec. 23, 1982

[30] Foreign Application Priority Data

Dec. 24, 1981 [JP] Japan .............................. 56-215666
Dec. 24, 1981 [JP] Japan .............................. 56-215667

[51] Int. Cl.$^4$ .............................................. G10L 5/00
[52] U.S. Cl. ..................................................... 381/43
[58] Field of Search .................................. 381/41–43, 381/44–46

[56] References Cited

U.S. PATENT DOCUMENTS

| | | | |
|---|---|---|---|
| 3,700,815 | 10/1972 | Doddington et al. | 381/42 |
| 4,256,924 | 3/1981 | Sakoe | 381/43 |
| 4,400,828 | 3/1981 | Pirz et al. | 381/43 |
| 4,403,114 | 9/1983 | Sakoe | 381/42 |
| 4,412,098 | 10/1983 | An | 381/43 |
| 4,467,437 | 8/1984 | Tsuruta et al. | 381/43 |

Primary Examiner—E. G. Matt Kemeny
Attorney, Agent, or Firm—Sughrue, Mion, Zinn, Macpeak, and Seas

[57] ABSTRACT

A pattern matching system comparing two patterns A and B, at least one of which is compressed in accordance with a piecewise straight line approximation and is represented by a series of representative vectors, of fewer number than the uncompressed pattern, and a series of extraction points of the representative vectors from the compressed pattern. First a distance is calculated between a segment of the compressed pattern and a point of the second pattern. Also a weighting coefficient is calculated depending on the length of the segment. From the latter two calculations three weighted distances are calculated appropriate to a recursion formula. The recursion formula is integrated by step wise incrementing the indices corresponding to the points of the two pattern. The final value of the recursion calculation is normalized to produce the final composite distance between the two patterns.

2 Claims, 20 Drawing Figures

PATTERN MATCHING SYSTEM

BACKGROUND OF THE INVENTION

This invention relates to a pattern matching system for comparing two patterns each given as a series of feature vectors like a voice pattern.

A pattern matching process wherein an incoming unknown pattern is compared with a plurality of dictionary patterns being previously registered and the one dictionary pattern with the highest similarity is determined as the incoming unknown pattern has been generally applied as an available method for pattern recognition.

It is essential for the pattern matching process to cope with variations, such as changes in speaking speed in a voice pattern. A time normalizing matching process (DP process) employing a dynamic programming process such as disclosed, for example, in U.S. Pat. Nos. 4,059,725 and 4,326,101 will be exceedingly effective. However, in the matching process, since a pattern to be matched should be expressed by a time series of feature vectors sampled at a predetermined constant period, a storage requirement for storing the feature vectors will inevitably increase to store a long voice pattern, and the amount of processing required will also increase. To overcome such problems, a compressed DP process is utilized wherein representative vectors are sampled at nonuniform sampling periods where there is present a stationary part in a pattern, like a vowel part of the voice pattern. Applying the DP process to a series of the representative vectors is proposed in the U.S. patent application Ser. No. 353,293 filed on Mar. 1, 1982.

However, in the compressed DP process, a data quantity is not compressed at a transition part in which the pattern changes, and the interval between a representative vector and succeeding representative vector is approximated retangularly, therefore an approximation error from the original pattern will be unavoidable. Then, by approximating the original pattern in a connection of straight line segments, i.e., piecewise straight line segment and extracting the connecting point as a representative vector, the data is compressed even at the transition part in which the pattern changes, and the approximation error from the original pattern is minimized, thus realizing a high precision of matching with less storage and computation requirements. In this case, however, the extracted representative vector has not already represented a section according to an original pattern, but a segment connecting the two adjacent representative vectors represents a section of the original pattern. In this respect, therefore, the conventional compressed DP matching process using the distance between the representative vector of a pattern A and the representative vector of a pattern B for matching of the two patterns A and B is not applicable when representative vectors are given as connecting points of the line segment.

SUMMARY OF THE INVENTION

It is, therefore, an object of the present invention to provide a new pattern matching system which is capable of using DP process when at least one of an input pattern and a dictionary pattern is approximated by a piecewise straight line segment, and which, accordingly, requires less storage capacity and a simpler circuit configuration.

The invention can be summarized as an apparatus for calculating a distance (a measure of similarity) between two patterns, each pattern represented by a series of vectors. In a first embodiment, one of the patterns is compressed by retaining only some of the vectors, that is, the pattern is represented by a series of straight lines of unequal lengths. In a second embodiment, both of the patterns are compressed. Perpendicular distances are calculated between the vectors of one pattern and the straight lines of the other pattern which has been compressed. Three different weights are calculated which depend upon the length of the straight line segment. These weights are appropriate to a recursion relation. The recursion relation is solved by stepping through the indices corresponding to the numbering of the retained vectors in the two patterns from the origin on one side to the extreme indices on the other side. The thus integrated recursion relationship, properly normalized, represents the composite distance between the two patterns and thus provides a numerical comparison of the two patterns.

According to one aspect of this invention, as described in detail, there is provided a pattern matching system comprising a first vector memory unit to store a series $\{a(1), \ldots, a(k), \ldots, a(K)\}$ of representative vectors obtainable through extracting a representative vector from the first pattern A given as a series of feature vectors when one pattern is compressed in piecewise straight line approximation and a series of extraction points $\{P(1), \ldots, P(k), \ldots, P(K)\}$, a second vector memory unit to store the second pattern $B\{b(1), \ldots b(l), \ldots, b(L)\}$ given as a series of feature vectors, a distance calculating unit to calculate a distance $d(l, k)$ between a line segment connecting representative vectors $a(k)$ and $a(k-1)$ in the vector space and a feature vector $b(l)$ in accordance with an address signal $(l, k)$, a weighted distance calculating unit to calculate a weighted distance according to a weight coefficient determined from a difference $\Delta P(k)(=P(k)-P(k-1))$ between extraction points $P(k)$ and $P(k-1)$ and the distance $d(l, k)$, and a matching unit to calculate a distance between the patterns A and B by considering a group of weighted distances obtained through changing the address signal $(l, k)$ to $k=1, \ldots, K, l=1, \ldots, L$.

According to such an arrangement as mentioned, a reference dictionary pattern can be compressed not only for the stationary part but also for the transition part, and further an error derived from the compression can be minimized, therefore a high time normalizing ability of the dynamic programming process can be brought into full play, and thus a low-cost and high performance pattern recognition system is obtained.

According to another aspect of this invention, by compressing both patterns in piecewise straight line, there is provided a pattern matching system comprising a first vector memory unit to store a series $\{a(1), \ldots, a(i), \ldots, a(I)\}$ of representative vectors obtained through extracting a representative vector from the first pattern A given as a series of feature vectors and a series $\{P(1), \ldots, P(i), \ldots, P(I)\}$ of extraction points, a second vector memory unit to store a series $\{b(1), \ldots, b(j), \ldots, b(J)\}$ of representative vectors obtained through extracting a repesentative vector from the second pattern B given as a series of feature vectors and a series $\{q(1), \ldots, q(j), \ldots, q(J)\}$ of extraction points, a distance calculating unit responsive to specified $i, j$ to calculate a distance $d_A(i, j)$ between a line segment connecting representative vectors $a(i+1)$ and $a(i)$ and a point corresponding to the representative vector b(j) and a distance $d_B(i, j)$ between a segment connecting the representative vectors b(j+1) and b(j) and a point corresponding to the representative vector a(i), a distance memory unit to store at least a predetermined number of distance data arrayed in a lattice which is obtained through changing i and j sequentially when the distance $d_A(i, j)$ is assigned with a side connecting points (i, j) and (i+1, j) and the distance $d_B(i, j)$ is assigned with a side connecting points (i, j) and (i, j+1) on the I×J lattice composed by I and J time points, an integral memory unit to store at least a predetermined number of integral value g of the distances to points and sides of the lattice, a recurrence formula calculating unit to calculate the integral value g at each point and side of the lattice through a plural combination of the weighted sum of the integral value previously stored in the integral memory unit and the distance previously stored in the distance memory unit, thereby obtaining the minimum integral value, which is characterized in that a distance between the patterns A and B is calculated by shifting i and j sequentially from i=1 and j=1 to i=I and j=J.

BRIEF DESCRIPTION OF THE DRAWINGS

FIG. 2(a) and FIG. 2(b) are diagrams for explaining a recurrence formula to determine integral value; FIG. 2(a) corresponds to the recurrence formula to determine the integral value between the approximated pattern A' and an original pattern B, and FIG. 2(b) corresponds to the recurrence formula to determine the integral value between the original patterns A and B;

DESCRIPTION OF THE PREFERRED EMBODIMENTS

A first embodiment of the present invention will be described hereinafter. In this embodiment, only one of two patterns is approximately compressed and a matching operation is performed by using a distance between a segment connecting two points corresponding to two adjacent representative vectors of the compressed pattern and a point corresponding to the vector of the other pattern.

Assume that two patterns A and B are expressed by series of feature vectors:

$$A = \{a(1), a(2), \ldots, a(J)\}$$

$$B = \{b(1), b(2), \ldots, b(L)\}$$

Then, when the pattern A is compressed in piecewise straight approximation, the series of representative vectors obtained as connecting points is expressed as pattern A':

$$A' = \{a'(1), \ldots, a'(K)\}$$

Further, a distance d(l, k) between a segment connecting two points each corresponding to two vectors a'(k−1) and a'(k), respectively, and a point corresponding to the vector b(l) is defined by d(l, k). The distance $d_o$ between a straight line connecting two points $x_1$ and $x_2$ and a point y in Euclidian space is obtained as follows.

$$d_o^2 = \frac{\|x_1 - y\|^2 \cdot \|x_2 - y\|^2 - |(x_1 - y) \cdot (x_2 - y)|^2}{\|x_1 - x_2\|^2}$$

Therefore, this equation is utilized to obtain the distance d(l, k). The distance between the pattern A' and the pattern B is calculated by using a dynamic programming process. Thus, the calculation of a recurrence formula (1) is provided for the dynamic programming process.

$$g(l, k) = \min \begin{pmatrix} d(l, k) + g(l - 1, k) \\ d(l, k) + g(l, k - 1) \\ 2d(l, k) + g(l - 1, k - 1) \end{pmatrix} \quad (1)$$

The integral value g(l, k) defined by the formula (1) is sequentially calculated in the range of $2 \leq k \leq K$ and $1 \leq l \leq L$, starting from the initial condition g(1, 1)=0. Finally, the integral value g(L, K) is derived and a distance D is calculated as the distance between the patterns A' and B.

$$D = g(L, K)/(L+K-1) \quad (2)$$

However, the section length in the original pattern A is not equal to the length of the corresponding segment in the pattern A', and hence it is not taken into consideration in the recurrence formula (1).

Figures 1A, 1B:
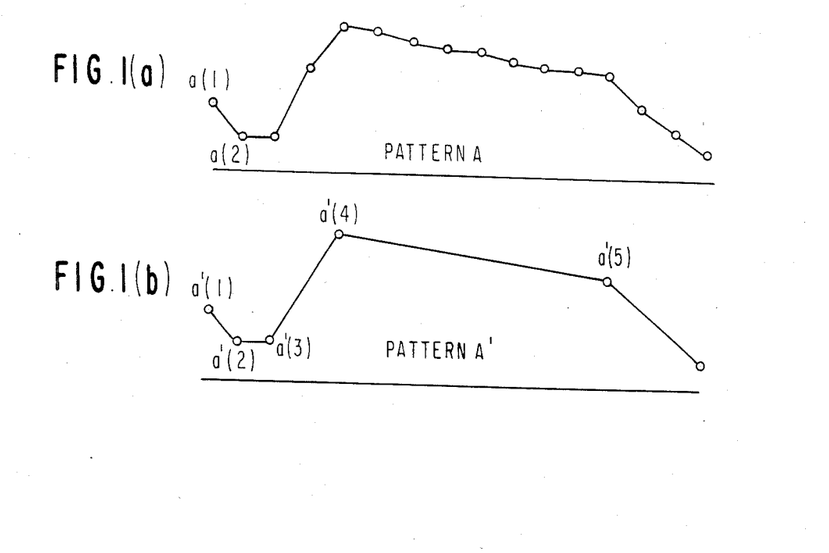
FIG. 1(a) shows an original pattern A and FIG. 1(b) shows the approximated pattern A' of the pattern A in a piecewise straight line.

FIGS. 1(a) and (b), which show the pattern A and the approximated pattern A', respectively, are provided for explaining such case. In FIG. 1(b), while the section (a'(4), a'(5)) covers a major part of the pattern, it is weighted equivalently to the section (a'(2), a'(3)) when the distance is integrated by the formula (1), thus being evaluated too lightly. Such problem can be overcome by weighting the distance d(l, k) by a segment length corresponding to the piecewise straight line when the pattern A is subjected to a piecewise straight line approximation. In other words, where an extraction point of the representative vector a'(k) is given, for example, at a point P(k) in the pattern A', the weighting to a segment connecting the representative vectors a'(k−1) and a'(K) can be determined by $$\Delta P(k) = P(k) - P(k-1)$$

and the following recurrence formula can be used instead of the formula (1):

$$g(l, k) = \min \begin{pmatrix} d(l, k) + g(l-1, k) \\ P(k)d(l, k) + g(l, k-1) \\ P(k) + 1)d(l, k) + g(l-1, k-1) \end{pmatrix} \quad (1)'$$

Figures 2A, 2B:
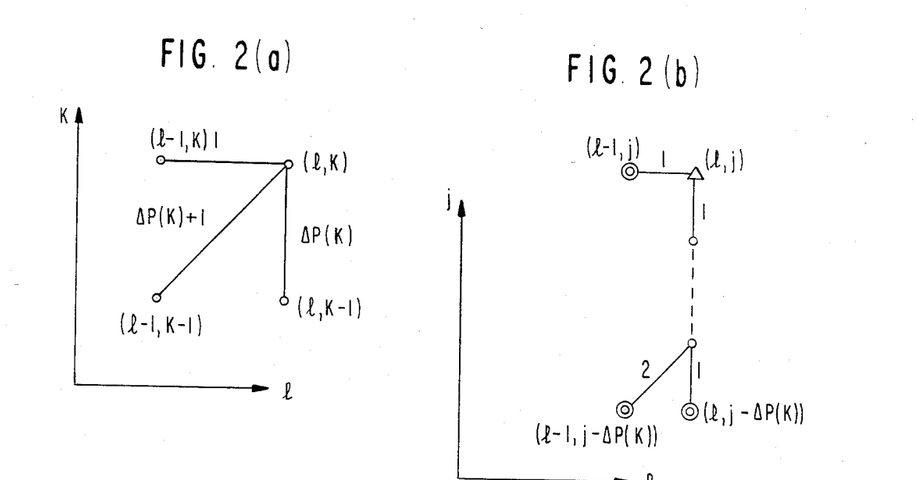

The recurrence formula (1)' means path and weighting shown in FIG. 2(a). When matching path of the patterns A and B before compression is considered particularly therefor, it implies a move from the positions with a double circle to the position with Δ mark in the drawing by means of path and weighting shown in FIG. 2(b). In the drawing, j, k and l denote time bases of the patterns A, A' and B, respectively.

In the first feature of this invention, matching of two patterns one of which is compressed in piecewise straight line approximation is realizable according to DP process including weighting as mentioned above, therefore a pattern matching system requiring less memory and fewer computations, yet having high precision will be obtained.

Figure 3:
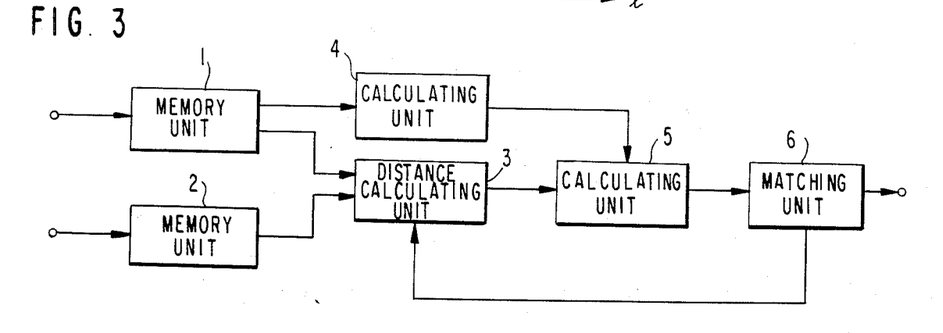
FIG. 3 is a block diagram of a first embodiment of the present invention.

Referring to FIG. 3, a series of representative vectors {a'(1), ..., a'(K)} of a pattern A' obtained by compressing the pattern A piecewise straight line approximation and a series of extraction points {P(1), ..., P(K)} of the representative vectors are stored in a first vector memory unit 1. A series of feature vectors {b(1), ..., b(L)} of a pattern B is stored in a second vector memory unit 2. A distance calculating unit 3 calculates a distance in a vector space, between a segment connecting vectors a'(k−1) and a'(k) and a point corresponding to a vector b(l). These vectors a'(k−1), a'(k) and b(l) are read out from the memory units 1 and 2 in accordance with an address signal (l, k).

Figure 4:
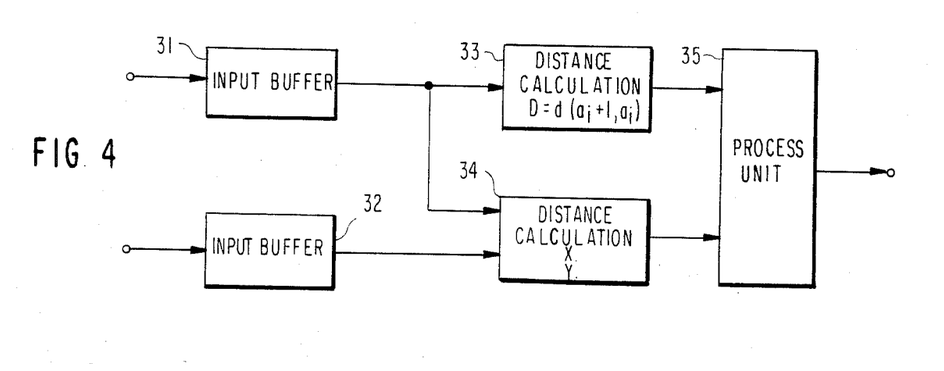
FIG. 4 is a block diagram of a distance calculating unit shown in FIG. 3.
Figures 5A, 5B, 5C:
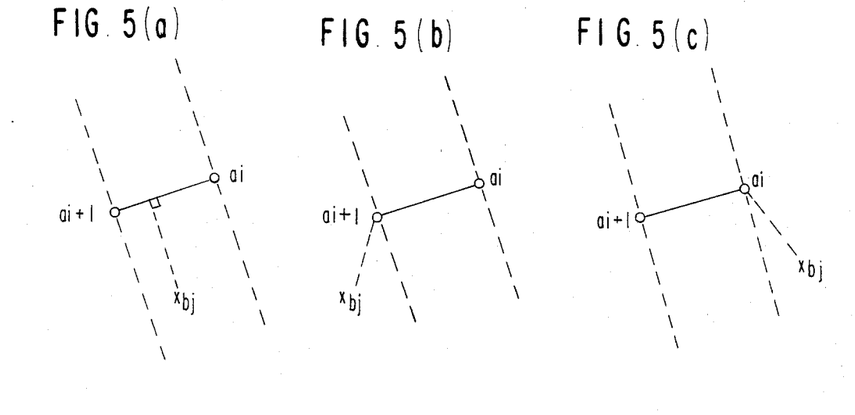
FIGS. 5(a), 5(b) and 5(c) show conception of distances determined by the distance calculating unit shown in FIG. 4.
Figure 6:
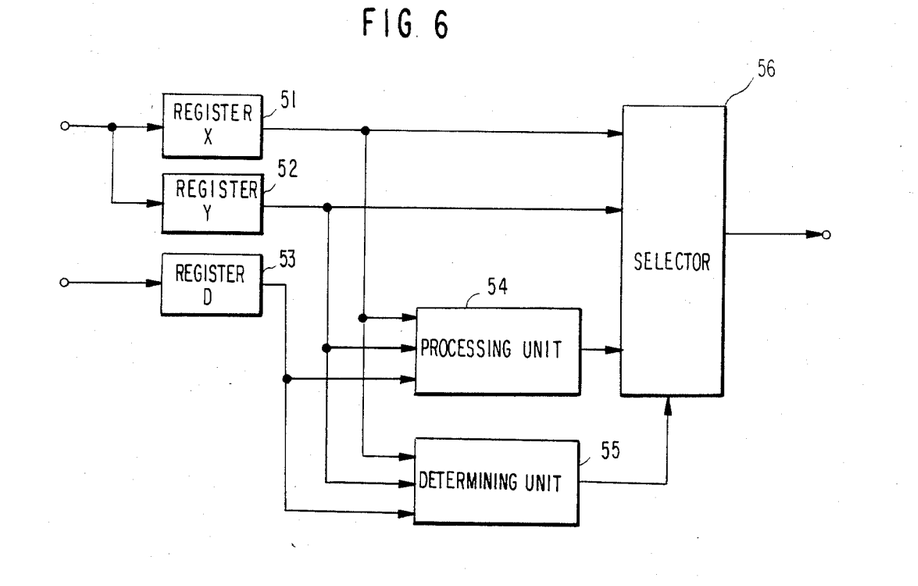
FIG. 6 is a block diagram of a processing unit shown in FIG. 4.

Referring to FIGS. 4, 5 and 6, the distance calculation will be explained hereinafter. Initially, two patterns A' and B are defined as:

$$A' = \{a'(1), \ldots, a'(k), a'(k+1), \ldots\}$$

$$B = \{b(1), \ldots, b(l), b(l+1), \ldots\}$$

In FIG. 4, the pattern A' including time serial vectors is inputted to an input buffer unit 31 and the pattern B including time serial vectors is inputted to an input buffer unit 32. Assuming, now, vectors a'(k) and a'(k+1) are stored in the input buffer unit 31 and the vector b(l) in the input buffer unit 32, an equation $$D = d(a'(k+1), a'(k)) \quad (3)$$

is calculated by a distance calculating unit 33. The above distance $d(a'(k+1), a'(k))$ then expresses a square of Euclidian distance in the vector space between the vectors a'(k+1) and a'(k).

On the other hand, equations $$X = d(a'(k+1), b(l)) \quad (4)$$

$$Y = d(a'(k), b(l)) \quad (5)$$

are calculated in a distance calculating unit 34, and outputs D, X and Y are all outputted to a processing unit 35. In the processing unit 35, a distance between a segment line $\overline{P(a'(k+1))\ P(a'(k))}$ and a point P(b(l)) is calculated as follows. Here, P(a') denotes a point corresponding to a vector a'.

A square Z of the length of a perpendicular line coming onto the straight line $\overline{P(a'(k+1))\ P(a'(k))}$ from the point P(b(l)) is represented by $$Z = \frac{|a'(k+1) - b(l)|^2 \cdot |a'(k) - b(l)|^2 - [(a'(k+1) - b(l))'(a'(k) - b(l))]^2}{|a'(k+1) - b(l) - (a'(k) - b(l))|^2}$$

where $a'(k+1) \neq a'(k)$. Then, a mark "," in the equation (6) represents a transposition of the vector.

By substituting the equations (3), (4) and (5) into the equation (6), $$Z = \{XY - \tfrac{1}{4}(X + Y - D)^2\}/D \quad (7)$$

A square e of the distance between the segment $\overline{P(a'(k+1))\ P(a'(k))}$ and the point P(b(l)) is defined as follows by using the equation (7).

| | | |
|---|---|---|
| Where D = 0 | e = X | (8) |
| Where D ≠ 0 and −D ≤ X − Y ≤ D | e = Z | (9) |
| Where D ≠ 0 and X − Y < −D | e = X | (10) |
| Where D ≠ 0 and X − Y > D | e = Y | (11) |

Conditions of the equation (9), (10) and (11) correspond to the cases where relationship between the segment $\overline{P(a'(k+1))\ P(a'(k))}$ and the point P(b(l)) are shown in FIGS. 5(a), 5(b) and 5(c), respectively.

In the processing unit 35 shown in FIG. 6, data X, Y and D sent from the processing units 33 and 34 are stored in registers 51, 52 and 53, respectively. A processing unit 54 calculates the output Z by the equation (7) in response to the input data D, X and Y, and a determining unit 55 compares the data D, X and Y to determined one of conditions each corresponding to the equations (8) to (11). A selector 56 then outputs one of the data X, Y and Z according to the selection control signal delivered from the determining unit 55.

Turning to FIG. 3 again, a calculating unit 4 calculates weighting coefficients ΔP(k)(=P(k)−P(k−1)) and ΔP(k)+1 from the extraction points P(k), P(k−1) read out of the memory unit 1 to apply to the recurrence formula (1)'. A calculating unit 5 produces distances d(1), d(2) and d(3) which are weighted with the weighting coefficient produced at the unit 4 to the distance d(l, k) delivered from the distance calculating unit 3.

d(1) = d(l, k)
d(2) = P(k)d(l, k)
d(3) = (ΔP(k) + 1)d(l, k))

The distances d(1), d(2) and d(3) are sent to a matching unit 6.

With an initial address signal (l, k)(=1, 1)) the matching unit 6 controls the distance calculating unit 3 and the weighting coefficient calculating unit 4 according to the address signal (l, k) to make them produce the distance d(l, k) and the weighted distances d(1), d(2) and d(3). Further, the matching unit 6 receives the weighted distances d(1), d(2) and d(3), and calculates an integral value g(l, k) by a recurrence formula (1)″ and by using the weighted distances d(1), d(2) and d(3), and previously produced integral values $g(l-1, k)$, $g(l, k-1)$ and $g(l-1, k-1)$ with an initial integral value $g(1, 1)(=0)$.

$$g(l, k) = \min \begin{pmatrix} d(1) + g(l-1, k) \\ d(2) + g(l, k-1) \\ d(3) + g(l-1, k-1) \end{pmatrix} \quad (1)''$$

The address signal $(l, k)$ is shifted under the control of the matching unit 6 from $l=1$, $k=1$, to $l=L$, $k=K$, and a distance D between two patterns $$D = g(L, K)/(L+J-1) \quad (2)'$$

Where $J = P(K) - P(1) + 1$ is finally calculated at the address of $l=L$, $k=K$ and outputted. Then, the equation (2)' is that of which K in the expression (2) is replaced with J, i.e. the length of pattern A' is replaced with that of pattern A before compression.

Figure 7:
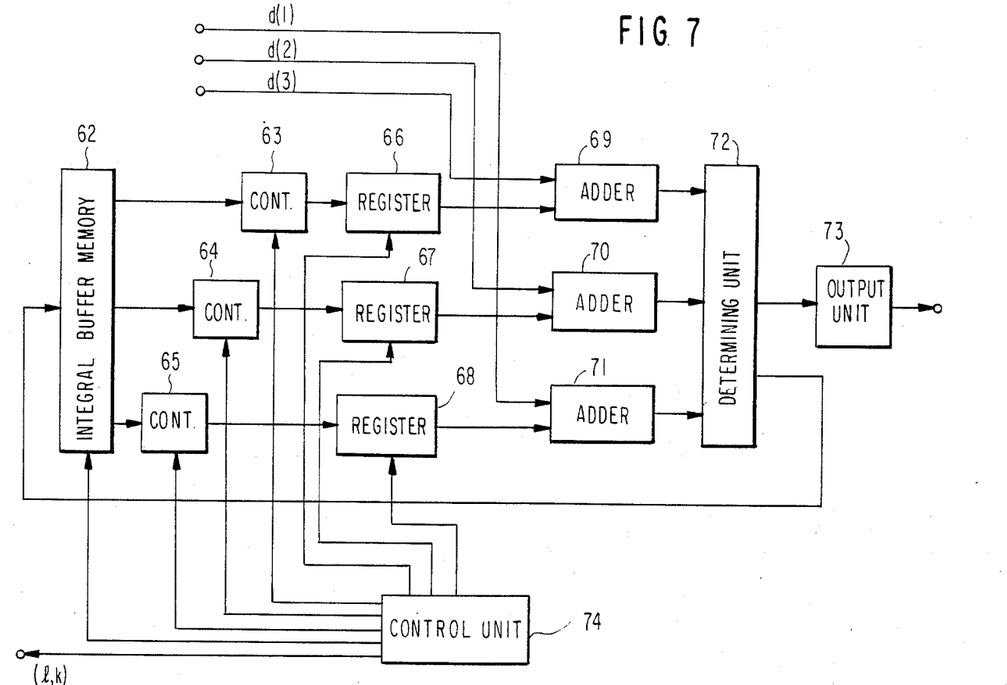
FIG. 7 is a block diagram of a matching unit shown in FIG. 3.

FIG. 7 is a block diagram of the matching unit 6 shown in FIG. 3. In the drawing, registers 66, 67, 68 temporarily store integral values $g(l-1, k)$, $g(l, k-1)$ and $g(l-1, k-1)$, which are on the right side of the recurrence formula (1)″, respectively. A control unit 74 controls overall behavior of matching unit 6 by shifting the address signals $(l, k)$, and after the registers 66, 67 and 68 are initialized the address $(l, k)$ is increased successively. Adders 69, 70 and 71 add the weighted distances $d(1)$, $d(2)$ and $d(3)$ and the values stored in the registers 66, 67, 68, respectively, and output results thus obtained. A minimum value determining unit 72 determines the minimum value among the three outputs of the adders 69, 70, 71, i.e., the integral value $g(l, k)$ defined by the recurrence formula (1)″ and outputs a result thus obtained. The result is stored in an integral buffer memory 62 and particulary in a location designated by the address $(l, k)$. Control units 63, 64 and 65 read out the integral values $g(l-1, k)$, $g(l, k-1)$ and $g(l-1, k-1)$ from the buffer memory 62 in according to the address $(l, k)$ and write them in the registers 66, 67 and 68. A output unit 73 divides an output of the minimum value determining unit 72, which is obtained at the time point of the address signal $(L, K)$ i.e., $g(L, K)$, by the pattern length as defined by the equation (2), and thus outputs the matching distance D.

In the first embodiment of the present invention as described above, the recurrence formula (1)' is applied. Furthermore, a recurrence formula $$g(l, k) = \min \begin{pmatrix} d(l, k) + g(l-1, k) \\ \Delta P(k) \, d(l, k) + g(l, k-1) \\ \Delta P(k) \, d(l, k) + g(l-1, k-1) \end{pmatrix}$$

or another recurrence formula similar thereto can be used instead of the formula (1)'.

Next, a second embodiment according to the second feature of the present invention will be described hereinafter. Now, a series of representative vectors extracted as connecting points when feature vectors of the two patterns A and B are both compressed in piecewise straight line approximation is expressed as $A = \{a(1), \ldots, a(i), \ldots, a(I)\}$ $B = \{b(1), \ldots, b(j), \ldots, b(J)\}$ and a series of extraction points of representative vectors of the pattern A and B is expressed as $P = \{p(1), \ldots, p(i), \ldots, p(I)\}$ $Q = \{q(1), \ldots, q(j), \ldots, q(J)\}$ In this case, a distance between the patterns A and B is obtained by using the recurrence formula (1) of conventional DP matching. Namely, with the initial condition given at $g(1, 1) = d(1, 1)$, a calculation of a recurrence formula $$g(i, j) = \min \begin{pmatrix} d(i, j) + g(i-1, j) \\ d(i, j) + g(i, j-1) \\ 2d(i, j) + g(i-1, j-1) \end{pmatrix} \quad (12)$$

is carried out sequentially from $i=1$ and $j=1$ to $i=I$ and $j=J$, where $d(i, j)$ denotes the distance measured between $a(i)$ and $b(j)$. The distance D between the patterns A and B is obtained from $g(I, J)$ finally calculated.

$$D = g(I, J)/(I+J-1)$$

Figure 9A:
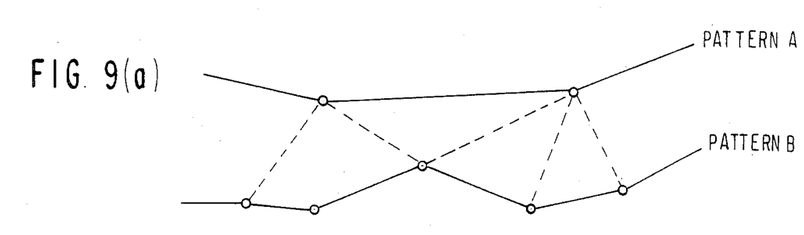
FIGS. 9(a), 9(b) and 9(c) are diagrams for explaining a matching process.

This procedure thus includes a matching process between two patterns by matching representative points (representative vectors) of the two patterns with each other as shown in FIG. 9(a).

Figures 9B, 9C, 10:
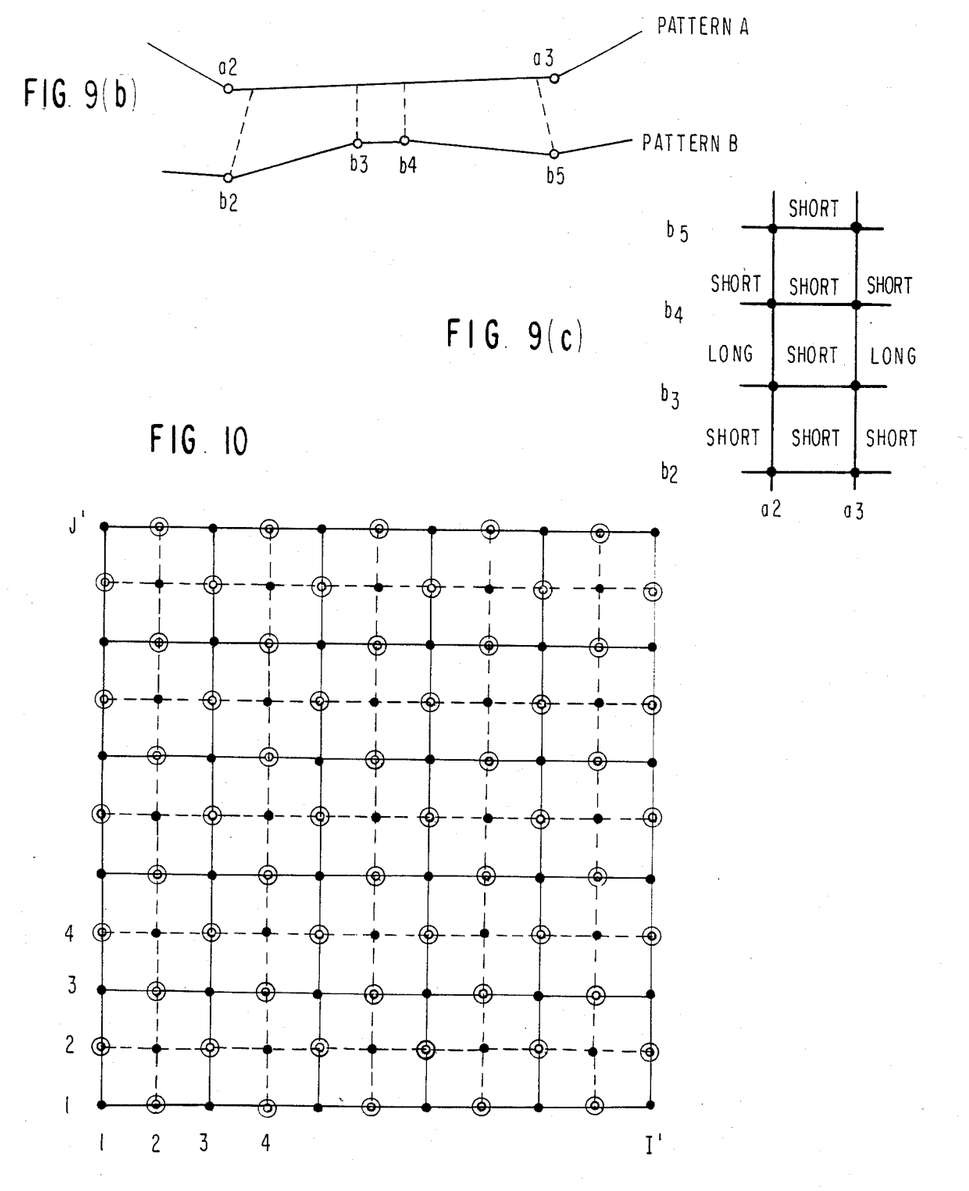
FIG. 10 is a diagram for explaining distances between two patterns in a second embodiment of the present invention.

Consider the case of two patterns A and B shown in FIG. 9(b), where the distance between a point $b_3$ and a segment $\overline{a_2 a_3}$ and the distance between a point $b_4$ and a segment $\overline{a_2 a_3}$ are short, and the distance between a segment $\overline{b_3 b_4}$ and a point $a_2$ and the distance between the segment $\overline{b_3 b_4}$ and a point $a_3$ are long. In this case, if the aforementioned method is applied, any matching path from the point (2,2) to the point (3,5) on the lattice causes a large integrated value in spite of the fact that the patterns A and B are similar, because $d(2,3)$, $d(3,3)$, $d(4,2)$ and $d(4,3)$ have large values. Such a problem can be overcome by letting the representative point of the one pattern correspond with a segment connecting representative points of the other pattern instead of letting the point correspond with a point of the other pattern. This treatment equivalently means matching a line segment of the one pattern with a sequence of line segments of the other pattern. For example, in FIG. 9(b), the segment $\overline{a_2 a_3}$ can correspond with a line segment series $\overline{b_2 b_3}$, $\overline{b_3 b_4}$ and $\overline{b_4 b_5}$. A matching process adopting such treatment can be realized by introducing distances $d_A(i, j)$ and $d_B(i, j)$ between a segment connecting adjacent representative vectors in the series of representative vectors of the one pattern and the representative vectors of the other pattern are defined instead of the distance $d(i, j)$.

$d_A(i, j) = \text{dist}(b(j), \overline{a(i-1)a(i)})$ $d_B(i, j) = \text{dist}(a(i), \overline{b(j-1)b(j)})$ \quad (13)

Figure 8:
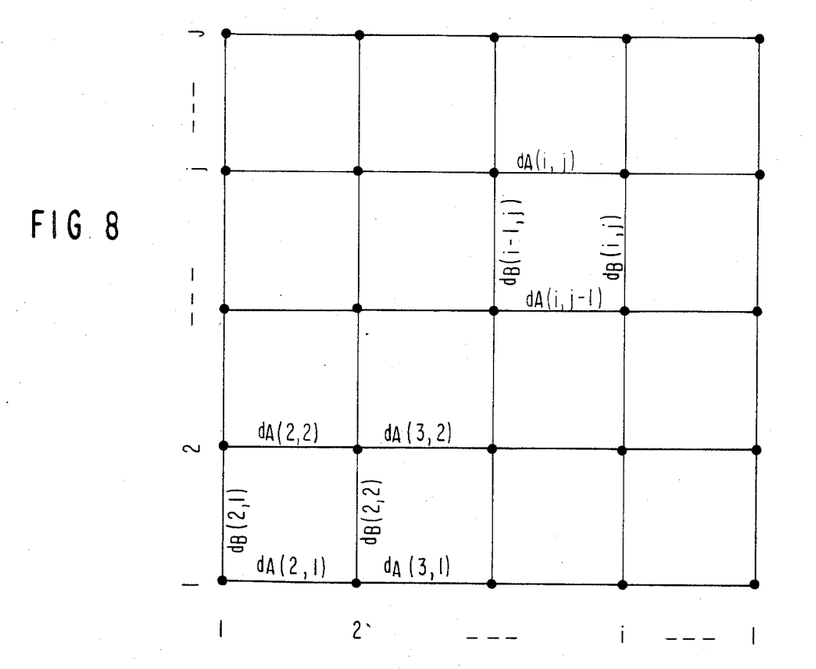
FIG. 8 is a diagram for explaining distances determined between two patterns.

In the equation (13), the notation $\overline{a(i-1)a(i)}$ represents a line segment connecting two points corresponding to the respective vectors $a(i-1)$ and $a(i)$ in the vector space, and the notation dist $(b(j), \overline{a(i-1)a(i)})$ represents the distance between the point corresponding to the vector $b(j)$ and the line segment $\overline{a(i-1)a(k)}$. The distances $d_A(i, j)$ and $d_B(i, j)$ are obtained by an equation of the same sort as equation (6). The distances $d_A(i, j)$ and $d_B(i, j)$ defined by the equation (13) with respect to $i=1, \ldots, I$ and $j=1, \ldots, J$ can be assigned on each side of a lattice M as shown in FIG. 8. An integral value g can be defined not only at each lattice point on the lattice M but also at each side of it As shown in FIG. 10, a lattice M' of size $(2'I-1) \times (2J'-1)$ will be used instead of the lattice M. In the lattice M', a lattice point $(i', j')$ corresponds to the lattice point $(i, j)$ of the lattice M when $i'=2i-1$ and $j'=2j-1$, i.e., both $i'$ and $j'$ are odd. When $i'=2i$ and $j'=2j-1$, i.e., $i'$ is even and $j'$ is odd, the lattice point $(i', j')$ corresponds to the side connecting points $(i+1, j)$ and $(i, j)$ of the lattice M. When $i'=2i-1$ and $j'=2j$, i.e., $i'$ is odd and $j'$ is even, it corresponds to the side connecting points $(i, j+1)$ and $(i, j)$. When $i'=2i$, $j'=2j$, i.e., both $i'$ and $j'$ are even, the point $(i', j')$ does not exist. In the lattice M', distances $d_A(i, j)$ and $d_B(i, j)$ are assigned with lattice points on M' as follows. When a distance corresponding to a point $(i', j')$ on the lattice M' is represented by $d'(i', j')$, $$d'(2i, 2j-1) = d_A(i,j), i=1, \ldots, I-1, j=1, \ldots J$$

$$d'(2i-1, 2j) = d_B(i,j), i=1, \ldots, I, j=1, \ldots, J-1 \quad (14)$$

and as weighting coefficients to the distance:

$$W_A(2i) = W_A(i)$$

$$W_B(2j) = W_B(j) \quad (15)$$

provided that weights $$W_A(i) = p(i+1) - p(i), \, W_B(j) = q(j+1) - q(j) \quad (16)$$

are used. FIG. 10 shows the structure of the lattice M'.

In the drawing, the double circle indicates a point for which the distance is defined.

Under the condition as mentioned above, when an integral value $g(i',j')$ similar to the recurrence formula (12) is assumed for to the point $(i', j')$ on the lattice M', the following recurrence formula can be used for the integral value g:

Initial value $g(1, 1) = 0$

When $i'$ and $j'$ are odd both, $$g(i', j') = \min \begin{pmatrix} \tfrac{1}{2} W_A(i' - 1)d'(i' - 1, j') + g(i' - 1, j') \\ \tfrac{1}{2} W_B(j' - 1)d'(i', j' - 1) + g(i', j' - 1) \end{pmatrix} \quad (17\text{-}1)$$

When $i'$ is odd and $j'$ is even, $$g(i', j') = \min \begin{pmatrix} W_A(i' - 1)d'(i', j') + g(i' - 2, j') \\ \tfrac{1}{2} W_B(j')d'(i', j') + g(i', j' - 1) \end{pmatrix} \quad (17\text{-}2)$$

When $i'$ is even and $j'$ is odd, $$g(i', j') = \min \begin{pmatrix} \tfrac{1}{2} W_A(i')d'(i, j') + g(i' - 1, j') \\ W_B(j' - 1)d(i', j') + g(i', j' - 2) \end{pmatrix} \quad (17\text{-}3)$$

Figure 11A:
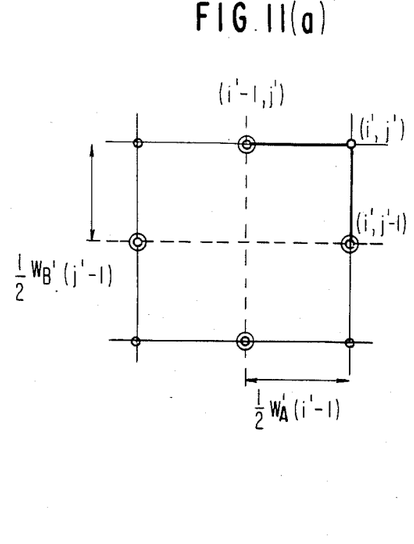
FIGS. 11(a), 11(b) and 11(c) are diagrams indicating a part of the diagram shown in FIG. 10 for explaining the recurrence formula according to the second feature of the present invention.
Figure 11B:
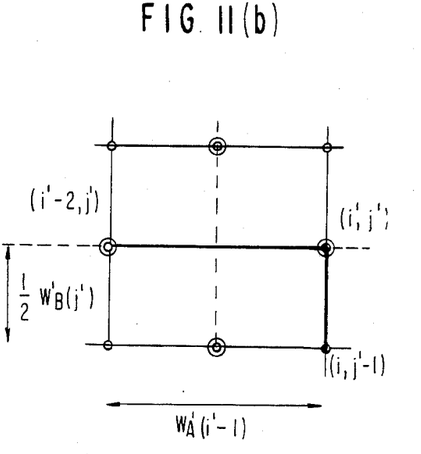
Figure 11C:
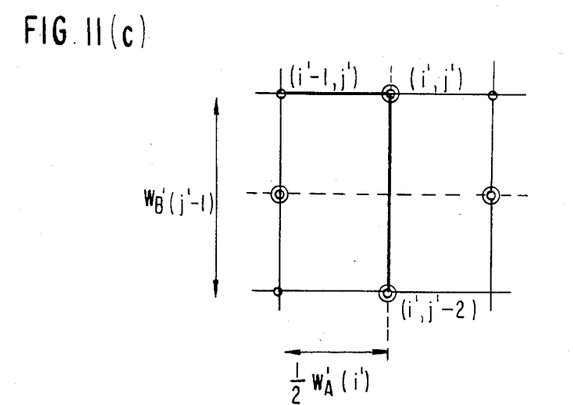

The formulas (17-1), (17-2) and (17-3) corresponds to paths and weights shown in FIG. 11(a), 11(b) and 11(c), respectively.

The recurrence formulas (17-1) to (17-3) are calculated in sequence from $i'=1$ and $j'=1$ to $i'-I'(=2I-1)$ and $j'=J'(=2J-1)$, and, thus, the integral value $g(I',J')$ is obtained finally. Dividing the integral value $g(I', J')$ by the sum of the lengths of the two original patterns A and B, a distance between the two patterns A and B is obtained as $$D = g(I', J')/(I^* + J^* - 1) \quad (18)$$

where $$I^* = p(I) - p(1),$$

$$J^* = q(J) - q(1).$$

Figure 12:
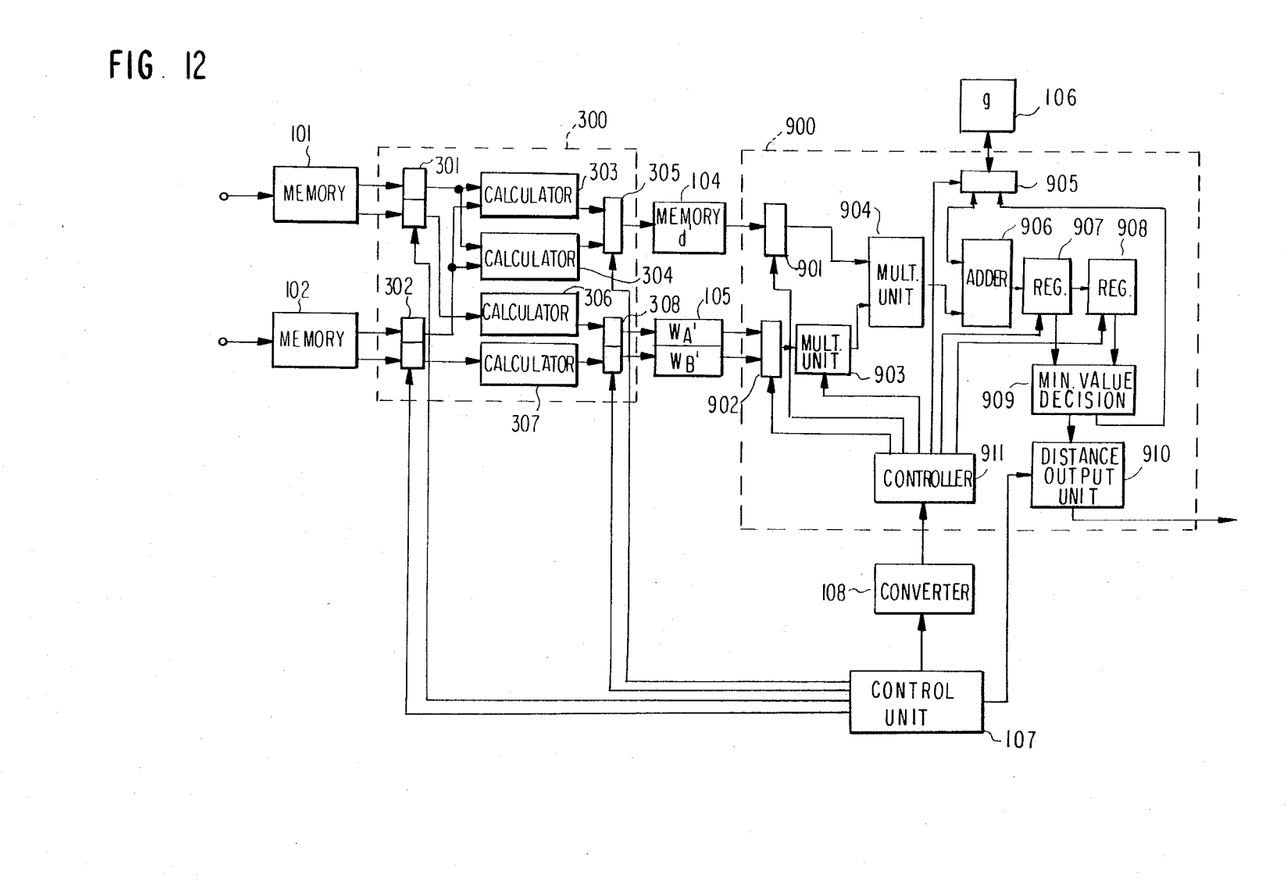
FIG. 12 is a block diagram of the second embodiment of the present invention.

Referring to FIG. 12 showing a second embodiment of this invention, a representative vector series $\{a(1), \ldots, a(i), \ldots, a(I)\}$ of a first pattern A obtainable through compression in the piecewise line approximation and an extraction point series $\{p(1), \ldots, p(I)\}$ of the representative vectors are stored in a first vector memory unit 101. A representative vector series $\{b(1), \ldots, b(j), \ldots, b(J)\}$ of the second pattern B and an extraction point series $\{a(1), \ldots, a(J)\}$ of the representative vectors are stored in a second vector memory unit 102. A distance calculating unit 300 calculates distances $d_A(i,j)$ and $d_B(i,j)$ defined by the recurrence formula (13) in response to i and j specified by a control unit 107 and also calculates weighting coefficients $W_A(i)$ and $W_B(j)$ defined by the equation (16).

In the distance calculating unit 300, control units 301 and 302 read out feature vectors $a(i-1)$, $a(i)$, $b(j-1)$ and $b(j)$ and extraction points $p(i-1)$, $p(i)$, $q(j-1)$ and $q(j)$, which are used for the calculation of distances $d_A(i,j)$ and $d_B(i,j)$ and weighting coefficients $W_A(i)$ and $W_B(j)$, from the memory units 101 and 102. A distance calculator 303 calculates the distance $d_A(i,j)$ responsive to the read vectors $a(i-1)$, $a(i)$ and $b(j)$. A distance calculator 304 also calculates the distance $d_B(i,j)$ likewise. A write controller 305 controls to store a value of the distances, as a distance, d' calculated by the distance calculators 303 and 304 into a distance memory 104. In this case, the write controller 305 specifies a write-location in the distance memory 104 according to the equation (14). The distance calculation at the distance calculators 303 and 304 can be done as in the case of the distance calculation in the first embodiment. Calculators 306 and 307 calculate the weighting coefficients $W_A(i)$ and $W_B(j)$ defined by the equation (16), respectively. Values thus obtained are stored in a weight memory 105 under the control of a write controller 308 as $W'''_A$ and $W'''_B$.

In this case, the write controller 308 specifies a write-location according to the equation (15).

A control signal converter 108 converts control signals i and j in to three ways as:

$$(i', j') = (2i - 2, 2j - 1)$$

$$(i', j') = (2i - 1, 2j - 2)$$

$$(i', j') = (2i - 1, 2j - 1)$$

and outputs them as control signals $i'$ and $j'$. An recurrence formula calculating unit 900 obtains an integral value g(i′, j′) responsive to the specified control signal i′ and j′ by calculating the formulas (17-1) to (17-3). In this case, distance information necessary for the calculation of the formulas (17-1) to (17-3) is read out from the distance memory 104 and the weight memory 105, the previously calculated integral value g is read out from an integral memory 106, and the integral value g(i′,j′) thus obtained is stored in the integral memory 106 again.

The calculation of the recurrence formulas (17-1) to (17-3) is carried out as follows: Read controllers 901, 902 and 905 specify read-locations in the distance memory 104, the weight memory 105 and the integral memory 106, respectively.

First, where the control signal (i′,j′) is $$(i', j') = (2i-2, 2j-1)$$

the recurrence formula (17-3) is calculated as follows: The read controllers 901, 902 and 905 read out the distance d′(i′,j′), the weighting coefficient $W_A'(i')$ and the integral value (i′−1, j′) according to a control signal delivered from a control unit 911. The weighting coefficient $W'_A(i')$ is supplied to a coefficient multiplying unit 903. The coefficient multiplying unit 903 multiplies the input coefficient by either coefficient of "1" or "½" according to the control of the controller 911, and outputs the result thus obtained. At this point in time, it is multiplied by "½". A multiplying unit 904 multiplies the distance read out from the memory 104 under the control of the read controller 901 by the output delivered from the coefficient multiplying unit 903. An adder 906 adds the weighted distance delivered from the unit 904 and a previous integral value read out from the memory 106 under the control of the read controller 905, and the result is stored in a register 907. Consequently, the calculated result stored in the register 907 corresponds to the upper part of the recurrence formula (17-3). Next, the control unit 911 controls the read controller 901, 902 and 905 so as to read-out of the distance d′(i′,j′), the weighting coefficient $W_B'(j'-1)$ and the integral value g(i′, j′−2), respectively. The coefficient multiplying unit 903, the multiplying unit 904 and the adder 906 operate in the same manner discribed above, and a calculation result corresponding to the lower part of the recurrent formula (17-3) is stored into the register 907.

In this case, the content corresponding to the upper part of the formula (17-3) in the register 907 is previously shifted to a register 908, and the coefficient "1" is used at the coefficient multiplying unit 903. A minimum value decision unit 909 compares values stored in two registers 907 and 908 and outputs the smaller value. The smaller value is then stored in the integral memory 106 as the integral value g′(i′,j′). Calculations of the recurrence formulas (17-2) and (17-1) are carried out in accordance with control signals (i′,j′)(=(2i−1, 2j−2)) and (i′,j′)(=(2i=1, 2j−1)), respectively, in the same manner described above.

A control unit 107 controls the distance calculating unit 300, the control signal converter 108 and the recurrence formula calculating unit 900 in accordance with the control signals i and j which are sequentially shifted from i=1 and j=1 to i=I and j=J, and a block 910 stead of the recurrence formulas employed in the description. Further, an arbitrary method is available for compressing patterns in the piecewise line approximation. The voice pattern has been taken up for example in the description, however, the invention can be applied to any arbitrary pattern of letter character, etc. subject to being expressed as a series of feature vectors.

What is claimed is:

1. A pattern matching system for comparing two patterns A and B, said system comprising:
    first memory means (1) for storing a series of representative vectors {a(1), - - - , a(k), - - - a(k)} and a series of extraction points {P(1), - - - , P(k), - - - , P(k)}, said series {a(1), - - - , a(k), - - - a(k)} indicating connecting points of a compressed pattern which is obtained by approximating said pattern A in a piecewise straight line approximation, said series {P(1), - - - , P(k), - - - , P(k)} indicating said connecting points;
    second memory means (2) for storing the second pattern B {b(1), . . . , b(l), . . . b(L)} expressed as a series of feature vectors;
    distance calculating means (3) for calculating a distance d(l,k) between a segment connecting representative vectors a(k) and a(k−1) and the feature vector b(l) in accordance with a control address (l,k);
    weighting coefficient calculating means (4) for calculating a weighting coefficient depending on a distance ΔP(k)=P(k)−P(k−1);
    weighted distance calculating means (5) for calculating a weighted distance defined by said distance d(l, k) and said weighting coefficient; and
    matching means (6) for calculating a composite distance between said patterns A and B by considering said weighted distance through shifting said control address signal (l, k) from k=1, . . . , K to l=1 . . . , L, said composite distance being a measure of similarity between patterns A and B.

2. A pattern matching system comparing two patterns A and B, said system comprising:
    first memory means (101) for storing a series of representative vectors {a(1), - - - , a(i), - - - a(I)} and a series of extraction points {P(1), - - - , P(i), - - - , P(I)}, the series {a(1), - - - , a(i), - - - , a(I)} indicating connecting points of a compressed pattern which is obtained by approximating said pattern A in a piecewise straight line approximation, the series {P(1), - - - , P(i), - - - , P(I)} indicating said connecting points;
    second memory means (102) for storing a series of representative vectors {b(1), - - - , b(j), - - - , b(J)} and a series of extraction points {q(1), - - - , q(j), - - - , q(J)}, the series {b(1), - - - , b(j), - - - , b(J)} indicating connecting points of a compressed pattern which is obtained by approximating said pattern B in a piecewise straight line approximation, the series {q(1), - - - , q(j), - - - , q(J)} indicating said connection points;
    first distance calculating means (303) for calculating a distance $d_A$(i, j) between a segment connecting point corresponding to the representative vector a(i);

distance storing means (104) for storing a predetermined number of distance information, said information being composed by said distance $d_A(i, j)$ assigned to a side connecting points (i, j) and i+1, j) on a lattice of time point I×J and by said distance $d_B(i, j)$ assigned to a side connecting points (i, j) and (i, j+1) of the said lattice, said storing means being controlled responsive to the control addresses i and j;

integral value storing means (106) for storing a predetermined number of integral values g, said integral values corresponding to points and sides of said lattice;

recurrence formula calculating means (901, 902, 903, 904, 905, 906 and 911) for calculating a weighted sum of the integral value g previously stored and the distances $d_A(i, j)$ and $d_B(i, j)$ in a plurality of combinations between the integral value g and distances $d_A$ and $d_B$; and matching means (907, 908, 909 and 910) for determining a composite distance between said patterns A and B by obtaining the minimum value of said integral value g by shifting the control address i and j from i=1 and j=1 to i=I and j=J, said composite distance being a measure of similarity between patterns A and B.

* * * * *